United States Patent Office 3,291,645
Patented Dec. 13, 1966

3,291,645
CORROSION INHIBITOR IN DRY CELL BATTERY
Lawrence P. Gould, Syracuse, N.Y., assignor to Allied Chemical Corporation, New York, N.Y., a corporation of New York
No Drawing. Filed Sept. 10, 1964, Ser. No. 395,551
5 Claims. (Cl. 136—107)

This invention relates to dry cell batteries and more particularly refers to a new and improved dry cell battery and method for reducing corrosion in batteries.

Ammonium chloride is an essential ingredient in common dry cells such as flashlight batteries. The ammonium chloride in solution form and in crystal form with other ingredients is sealed in a zinc can having the required dimensions of the battery.

When the battery is made an undesirable chemical reaction occurs which tends to corrode the zinc can. This wasteful corrosion of zinc diminishes the shelf life of the battery and decreases the service capacity of the battery. The problems and difficulties involved in corrosion of zinc in dry cell batteries has engaged the attention of researchers for many years as exemplified by the article entitled "Effect of Inhibitors on the Corrosion of Zinc in Dry-Cell Electrolytes," U.S. Department of Commerce National Bureau of Standards, Research Paper RP1863, vol. 40, February 1948; the article in the Journal of the Electrochemical Society, vol. 99, No. 8, August 1952, pages 179C to 187C, wherein the authors state, "It is the wasteful corrosion of zinc, rather than its anodic behavior in the operating cell, that has demanded the attention of the battery technologist," and "Even today, the wasteful corrosion of zinc in cells on long time intermittent service may be as much as 50 percent as great as the weight of metal utilized in generating current," and "The problem of finding corrosion inhibitors, other than mercury, effective under the variable conditions of cell discharge and compatible with the standard dry battery ingredients, has not proved a simple task"; and the more recent article in the Journal of Applied Chemistry, 10, April 1960, entitled "Corrosion of Zinc, I, Corrosion in Impure Ammonium chloride Solution" by F. G. Stickland, pages 155–171.

An object of the present invention is to provide an additive which will reduce the corrosion of zinc by ammonium chloride in a dry cell battery. Other objects and advantages of the present invention will be apparent from the following description.

In accordance with the present invention corrosion of zinc by ammonium chloride in a dry cell battery is materially reduced by the incorporation of an additive having the formula $RSO_2NHCH_2COOM$ wherein R is an aliphatic hydrocarbon radical containing 8–20 carbon atoms inclusive, preferably 12–14 carbon atoms inclusive and M is an alkali metal preferably sodium. The preferred additive is one wherein R is lauryl and M is sodium.

The additives of the present invention are highly effective and only very minute quantities of the order of 50 parts per million or less based on the amount of ammonium chloride are needed to materially reduce corrosion. Larger amounts may be employed and up to about 2000 p.p.m. effect further reduction in corrosion. Quantities above 2000 p.p.m. may be employed but do not give much additional benefit.

The additives may be incorporated in the battery in any convenient way. A preferred method is to uniformly distribute the additive throughout the ammonium chloride prior to its incorporation in the battery. This may be accomplished by dissolving the additive in a volatile solvent and the solution added to hot dry crystals of ammonium chloride in a mixing conveyor. By this method a solvent is distributed over the crystals and evaporated by the sensible heat of the crystals leaving the additive in the form of thin film over the crystal surface. In another method the additive may be dissolved or suspended in a clear, hot, agitated liquor in the ammonium chloride process prior to crystal formation. By this method, the additive is distributed uniformly over the crystals so that as the crystals are subsequently filtered, dried and screened, the additive is thoroughly mixed with the crystals.

The following example illustrates the present invention.

The test procedure was that published by the British Standards Institution No. 3448 in 1961 with the modification of 50° C. for 24 hours instead of the lower temperature for a longer time. In this test procedure the hydrogen evolved is measured by weighing the electrolyte displaced to the nearest 0.1 gram. The lower this figure the less the corrosion. In Table I below are given the experimental results of the effect of the additive on corrosiveness toward zinc in comparison with a test without an additive.

Table I

| Additive | P.p.m. | Method of Addition | G. Electrolyte (Corrosiveness) |
|---|---|---|---|
| None | none | | 30.9 |
| $RSO_2NHCH_2COOM$ | 150 | $CH_2Cl_2$ Solvent | 2.6 |

R=lauryl, M=Na.

Although certain preferred embodiments of the invention have been disclosed for purposes of illustration, it will be evident that various changes and modifications may be made therein without departing from the scope and spirit of the invention.

I claim:

1. A method of reducing corrosion of zinc in an ammonium chloride dry cell battery electrolyte which comprises incorporating in said electrolyte an additive having the formula $RSO_2NHCH_2COOM$ wherein R is an aliphatic hydrocarbon radical containing 8–20 carbon atoms inclusive and M is an alkali metal.

2. A method as claimed in claim 1 wherein the additive is in an amount of about 50 parts per million to about 2000 parts per million based on the amount of ammonium chloride.

3. A method as claimed in claim 1 wherein R is an aliphatic hydrocarbon radical containing 12–14 carbon atoms inclusive and M is sodium.

4. A method as claimed in claim 1 wherein in the formula R is lauryl and M is Na.

5. A dry cell battery comprising a zinc electrode in contact with an ammonium chloride electrolyte, said electrolyte having an additive incorporated therein having the formula $RSO_2NHCH_2COOM$ wherein R is an aliphatic hydrocarbon radical containing 8–20 carbon atoms inclusive and M is an alkali metal to reduce corrosion of zinc by ammonium chloride in the dry cell battery.

References Cited by the Examiner

UNITED STATES PATENTS

| | | | |
|---|---|---|---|
| 2,578,725 | 12/1951 | Michel et al. | 252—391 X |
| 2,897,250 | 7/1959 | Klopp | 136—107 |
| 2,900,434 | 8/1959 | Zimmerman et al. | 136—161 |
| 2,908,648 | 10/1959 | Spivack et al. | 252—391 X |

OTHER REFERENCES

Morehouse et al.: Effect of Inhibitors on the Corrosion of Zinc in Dry-Cell Electrolytes, National Bureau of Standards, Research Paper RP1863, vol. 40, February 1948.

WINSTON A. DOUGLAS, *Primary Examiner.*

D. L. WALTON, *Assistant Examiner.*